(12) United States Patent
Niimi

(10) Patent No.: US 9,003,901 B2
(45) Date of Patent: Apr. 14, 2015

(54) STARTER FOR ENGINE

(75) Inventor: Masami Niimi, Handa (JP)

(73) Assignee: Denso Corporation, Kariya (JP)

( * ) Notice: Subject to any disclaimer, the term of this patent is extended or adjusted under 35 U.S.C. 154(b) by 108 days.

(21) Appl. No.: 13/484,900

(22) Filed: May 31, 2012

(65) Prior Publication Data

US 2012/0312123 A1  Dec. 13, 2012

(30) Foreign Application Priority Data

Jun. 13, 2011 (JP) .................................. 2011-131377

(51) Int. Cl.
| | |
|---|---|
| F02N 15/06 | (2006.01) |
| F02N 15/00 | (2006.01) |
| F02N 15/02 | (2006.01) |
| F02N 15/04 | (2006.01) |
| F02N 11/08 | (2006.01) |
| H02K 11/00 | (2006.01) |

(52) U.S. Cl.
CPC .......... *F02N 11/0855* (2013.01); *F02N 15/043* (2013.01); *F02N 15/067* (2013.01); *H02K 11/0031* (2013.01); *F02N 15/046* (2013.01); *F02N 2200/041* (2013.01)
USPC ...................... 74/7 A; 76/6; 76/7 R

(58) Field of Classification Search
CPC ..... F02N 15/067; F02N 11/00; F02N 15/046; F02N 11/0814; F02N 15/00; F02N 11/087; F02N 15/062
USPC .................. 74/6, 7 A, 7 B, 7 C, 7 D, 7 E, 7 R
See application file for complete search history.

(56) References Cited

U.S. PATENT DOCUMENTS

| | | | |
|---|---|---|---|
| 6,460,428 B2 * | 10/2002 | Yumiyama et al. | .......... 74/502.4 |
| 7,243,627 B2 | 7/2007 | Izumi et al. | |
| 7,451,668 B2 | 11/2008 | Hasegawa et al. | |
| 8,534,145 B2 | 9/2013 | Niimi et al. | |
| 8,601,888 B2 * | 12/2013 | Niimi | .............................. 74/7 A |
| 2005/0076727 A1 | 4/2005 | Hasegawa et al. | |
| 2005/0193840 A1 | 9/2005 | Murase et al. | |
| 2006/0042578 A1 | 3/2006 | Izumi et al. | |

(Continued)

FOREIGN PATENT DOCUMENTS

| | | |
|---|---|---|
| CN | 101892933 A | 11/2010 |
| JP | A-H05-044523 | 2/1993 |

(Continued)

OTHER PUBLICATIONS

May 20, 2014 Office Action issued in Japanese Patent Application No. 2011-131377 (with translation).

(Continued)

*Primary Examiner* — Justin Krause
(74) *Attorney, Agent, or Firm* — Oliff PLC

(57) ABSTRACT

A starter includes a motor, a speed reducer, a pinion that transmits the drive torque of the motor to an engine ring gear, a partition wall that separates between the motor and the speed reducer, a pinion driving solenoid that pushes out the pinion to the ring gear side, and a motor energizing switch that opens and closes an electric point of contact. The starter is able to control independently operation of the pinion drive solenoid and operation of the motor energizing switch, the starter further includes a rotation detector disposed in a motor side inner space separated by the partition wall.

8 Claims, 5 Drawing Sheets

(56) References Cited

U.S. PATENT DOCUMENTS

| | | |
|---|---|---|
| 2009/0183595 A1 | 7/2009 | Niimi |
| 2010/0257975 A1* | 10/2010 | Niimi et al. ............... 74/7 C |
| 2010/0264670 A1 | 10/2010 | Usami et al. |
| 2010/0269630 A1 | 10/2010 | Niimi et al. |
| 2010/0282199 A1 | 11/2010 | Heyers et al. |
| 2011/0001589 A1 | 1/2011 | Usami et al. |
| 2011/0203410 A1* | 8/2011 | Notani ..................... 74/7 R |
| 2012/0247270 A1* | 10/2012 | Ikemori et al. ............ 74/7 E |
| 2012/0304818 A1* | 12/2012 | Moriya et al. ............ 74/7 A |

FOREIGN PATENT DOCUMENTS

| | | |
|---|---|---|
| JP | 2005-113816 A | 4/2005 |
| JP | A-2005-240706 | 9/2005 |
| JP | A-2006-042471 | 2/2006 |
| JP | A-2006-070753 | 3/2006 |
| JP | 2007-040459 A | 2/2007 |
| JP | A-2007-028807 | 2/2007 |
| JP | A-2009-191843 | 8/2009 |
| JP | A-2009-529114 | 8/2009 |
| JP | 2010-255523 A | 11/2010 |
| JP | 2011-001947 A | 1/2011 |
| JP | A-2011-29138 | 2/2011 |

OTHER PUBLICATIONS

Jun. 26, 2014 Chinese Office Action issued in Application No. 201210192026.1 (with English Translation).

Feb. 3, 2015 Office Action issued in Japanese Application No. 2011-131377.

* cited by examiner

STARTER FOR ENGINE

CROSS-REFERENCE TO RELATED APPLICATION

This application is based on and claims the benefit of priority from earlier Japanese Patent Application No. 2011-131377 filed Jun. 13, 2011, the description of which is incorporated herein by reference,

TECHNICAL FIELD

The present disclosure relates to a starter that can independently control an operation of pushing out a pinion to an engine ring gear side, and a switching action of electric contact that intermits a current that flows into a motor.

BACKGROUND

In recent years, an idling-stop of vehicles has become an important means as one of the $CO_2$ reduction measures in a battle against global warming.

The idling-stop is a system that stops fuel injection to an engine in order to stop the engine automatically when the vehicles stop at a crossing by a traffic light, traffic congestion, etc., for example.

In a conventional starter that starts the engine, an engine ring gear has to be stopped or a pinion cannot be engaged with the ring gear fundamentally.

For this reason, even when the idling-stop is performed because of a red light at the crossing and the light changes to a green light before a rotation of the engine stops completely, for example, the engine cannot be re-started immediately.

Therefore, it is desired that a technology that can re-start the engine immediately when a user performs a starting operation (releasing a brake, shifting into a drive range, etc., for example), that is, when a re-starting demand occurs even when the rotation of the engine is decreasing by engine inertia.

In order to realize such a technology, the pinion of the starter is needed to be engaged with the rotating ring gear.

There is a method of independently controlling an operation that pushes out the pinion to the engine ring gear side and an operation that opens and closes an electric point of contact for intermitting a current that flows into a motor, as one means to make the technology possible (refer to Japanese Patent Application Laid-Open Publication No. 2009-191843).

Important requirements in controlling independently the operation that pushes out the pinion to the ring gear side and opening-and-closing operation of the electric point of contact are relative number of rotations of the ring gear and the pinion, and it is needless to mention that the smaller the relative number of rotations, the smoother the engagement of the pinion and the ring gear.

Especially when the re-starting demand arises in a high range of the engine rotation, it becomes possible to obtain the required relative number of rotations (for example, 100 rpm or less) that the ring gear and the pinion can engage smoothly in shorter time by starting the motor before the operation that pushes out the pinion to the ring gear side, thus shortening the re-starting time, and there is an advantage also in the improvement in fuel consumption.

In addition, it is natural to consider the number of rotations of the pinion with a value converted into a gear ratio relative to the ring gear.

As mentioned above, it is necessary to acquire the rotation speed of the both ring gear and the pinion in the control that pushes out the pinion and make it engaged with the ring gear after starting the motor.

Although the rotation of the ring gear can be detected by using the rotation signal from an existing crank angle sensor etc., for example, it is necessary to detect the rotation of the pinion using an independent rotation detector.

For example, as shown in Japanese Patent Application Laid-Open Publication No. 2009-529114, a method of detecting the rotation of the pinion by the rotation detector disposed near the pinion, or a method that an armature shaft of the motor is extended in an axial direction to outside of an end frame, detecting the rotation of the armature shaft by the rotation detector disposed near the extended end of the shaft, and obtain the rotation speed of the pinion from the rotation of the armature shaft, or the like can be considered.

However, when using the independent rotation detector in order to detect the rotation of the pinion, when detecting the rotation of the pinion directly, or when the detecting rotation of the armature shaft extended outside of the frame and obtaining the rotation speed of the pinion, the rotation detector should be disposed outside the starter.

Since a mounting space for the rotation detector is needed in these cases and mountability is restricted, it is difficult to arrange a rotation detector at a suitable place.

On the other hand, Japanese Patent Application Laid-Open Publication No. 2011-29138 discloses a controlling method that is provided with no rotation detector to the pinion, but a rotation starting characteristic of the motor is memorized in the internal memory of a control device, and the rotating speed of the pinion estimated based on the lapsed time after turning on the motor.

However, since the motor used for the starter is generally a direct-current commutator motor, there is a defect that a rotation speed is not stabilized easily with time.

That is, since mechanical loss decreases by wear of a brush and an electric loss increases, the rotation behavior changes easily.

It is likely that when the rotation speed changes, the suitable relative number of rotations of the pinion to the ring gear also changes, which increases the noise at the time of engagement, and in a worst case, wear of the gears advances.

Therefore, since it is necessary to compose a control logic that predicts the change of the rotation behavior in the conventional technology disclosed in '138, control becomes complicated, and it is difficult to perform precise control in order to synchronize the rotation of the pinion with the ring gear whose rotation is slowing.

SUMMARY

An embodiment provides a starter that has a rotation detector that outputs a rotation signal according to a rotating speed of a motor, and disposes the rotation detector using an internal space of the motor, so that when a re-starting demand occurs during a process where the engine is stopping, a precise control can be performed for re-starting the engine by engaging the pinion with the ring gear whose rotation is slowing at suitable relative number of rotations without restricting mountability.

In a starter according to a first aspect, the starter includes a motor that has an armature with a commutator disposed in an end of an armature shaft and generates torque in the armature, a speed reducer that reduces a rotating speed of the motor and increases drive torque, the speed reducer being disposed in the motor opposite to the commutator, and a pinion that transmits the drive torque increased by the speed reducer to an engine ring gear.

The starter further includes a partition wall that is disposed between the motor and the speed reducer to separate the motor and the speed reducer, the partition wall having a hole formed in a central part for passing through the end of the armature shaft, a pinion driving solenoid that forms a first electromagnet by energization and pushes out the pinion to the ring gear side by using an attraction power of the first electromagnet, and a motor energizing switch that has a second solenoid that forms a second electromagnet by energization and opens and closes an electric point of contact interlocking with an ON/OFF operation of the solenoid for intermitting a current flowing into the motor.

The starter is able to control independently operation of the pinion drive solenoid and operation of the motor energizing switch, the starter further comprising a rotation detector that outputs a rotation signal of a frequency proportional to the rotating speed of the motor, and the rotation detector is disposed in a motor side inner space separated by the partition wall.

According to the composition of the present disclosure, since it is not necessary to secure mounting space for the rotation detector outside the starter, ease of mounting to the engine is not reduced.

Moreover, since the rotating speed of the motor is computable based on the rotation signal outputted from the rotation detector, more precise control of the starter becomes possible as compared with the method disclosed in the Publication '138, which is the method that memorizes the rotation starting characteristic of the motor in the internal memory of the control device, and presuming the rotating speed of the pinion based on the lapsed time after turning on the motor, for example.

In addition, the rotation signal outputted from the rotation detector is inputted into a control device (electronic control unit generally called ECU) that controls operations of a pinion driving solenoid and a motor energizing switch.

The control device calculates the rotating speed of the motor based on the inputted rotation signal, and can obtain the rotating speed of the pinion by multiplying a moderating ratio to the rotating speed of the motor.

By this, the relative number of the rotations of the ring gear and the pinion can be obtained with sufficient accuracy by calculating the rotating speed of the pinion from the rotating speed of the motor even when the re-starting demand occurs after the idling-stop is performed and before the rotation of the engine stops completely.

Therefore, the relative number of the rotations when the pinion engages with the ring gear can be made small.

In other words, it also becomes possible to engage the pinion to the ring gear where the rotation of the pinion is synchronized with the rotation of the ring gear.
As a result, reduction of the noise generated at the time of engagement and wear control of gears can be continued for a long period of time.

In the starter according to a second aspect, the rotation detector has a detecting coil, which is disposed annularly surrounding a circumference of the armature shaft, that generates an induced voltage according to changes of a magnetic flux interlinked with the rotation of the armature shaft. A periodic change of the induced voltage generated in the detecting coil is outputted as the rotation signal.

Since there is a margin available in a space between the armature core supported by the armature shaft and partition wall in the motor side separated by the partition wall, a detecting coil can be disposed around the armature shaft using the space.

In the starter according to a third aspect, the rotation detector has a plurality of detection teeth that face an inner circumference of the detecting coil and are disposed in a circumferential direction of the armature shaft at equal intervals, and the detecting coil is magnetized to form a bias magnetic field and the magnetic flux that interlinks to the detecting coil changes periodically due to the rotation of the plurality of detection teeth in the bias magnetic field.

In the starter according to a fourth aspect, the speed reducer is an epicycle reduction gear that has planet gears that engage with a sun gear formed in another end of the armature shaft, and the planet gears engage with the sun gear and rotate on their axes and revolve around the armature shaft. The plurality of detection teeth formed in the armature shaft are formed by the sun gear.

In the starter according to a fifth aspect, the rotation detector has a permanent magnet, which is attached to the armature shaft or one end side opposite to the commutator of the armature core supported by the armature shaft, that rotates unitarily with the armature, and a yoke that forms a claw-pole type magnetic circuit disposed in a circumference of the detecting coil that is magnetized with the permanent magnet.

In the starter according to a sixth aspect, the partition wall is made of a plate material, which is a ferromagnetic substance.

In the starter according to a seventh aspect, the motor energizing switch forms the electric point of contact between a battery side terminal and a motor side terminal that are connected to a power supply line for supplying electric power to the motor from a battery, and the electric power is supplied to the rotation detector through the battery side terminal or the motor side terminal.

In the starter according to an eighth aspect, the rotation detector has a circuit board that includes waveform processing circuit that processes a periodic change of an induced voltage that occurs in the detecting coils, and the circuit board is attached to a motor side wall of the partition wall.

BRIEF DESCRIPTION OF THE DRAWINGS

In the accompanying drawings.

DETAILED DESCRIPTION OF THE PREFERRED EMBODIMENTS

With reference to the drawings, hereinafter will be described an embodiment of the present disclosure in detail.

First Embodiment

Figure 1:
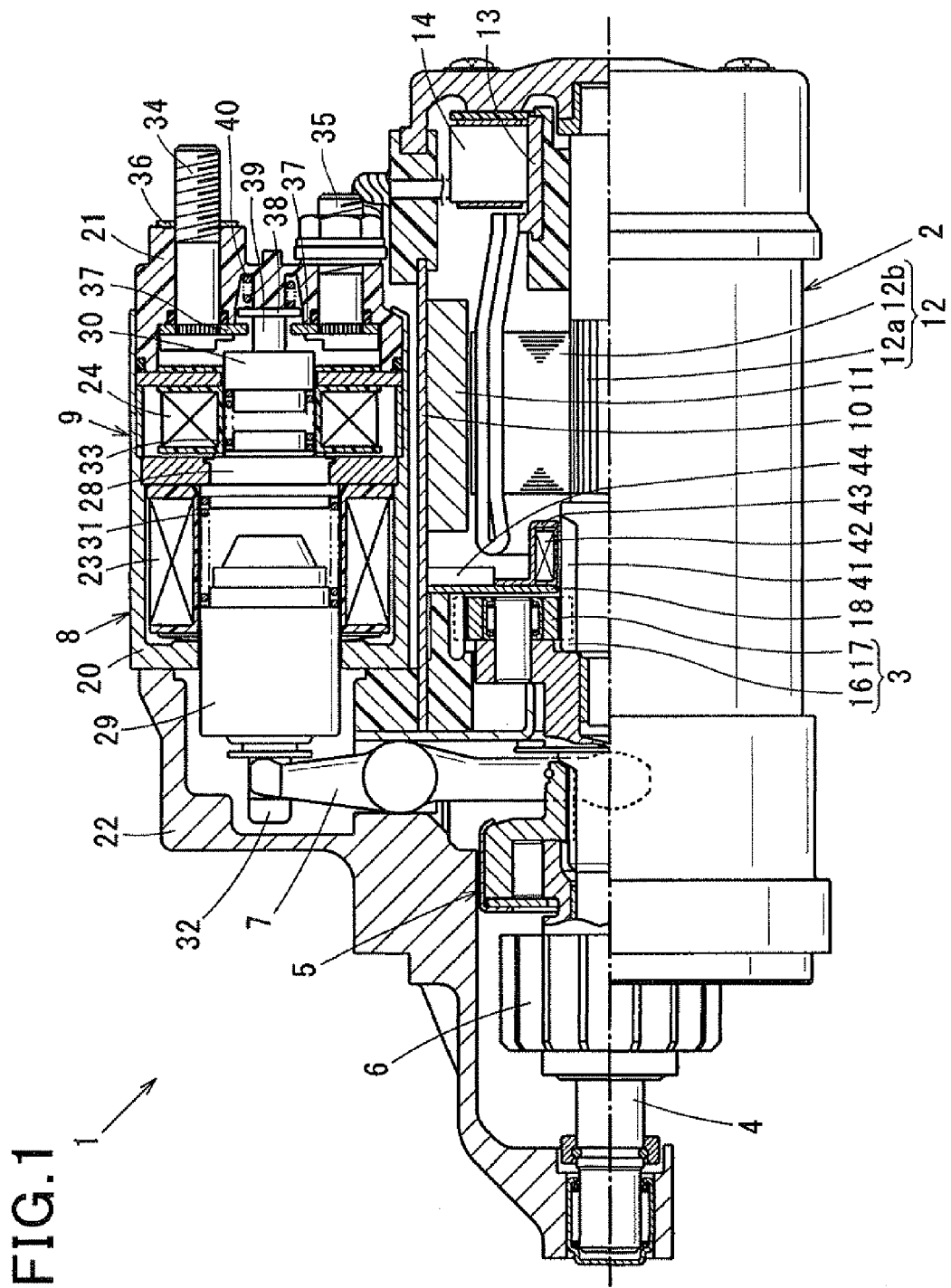
FIG. 1 shows a sectional view of a starter in a first embodiment.

A starter 1 in the first embodiment is mainly constituted of a motor 2 that generates torque, a speed reducer 3, an output shaft 4 connected with the speed reducer 3, a pinion 6, a pinion driving solenoid 8, a motor energizing switch 9 that opens and closes a main point of contact (mentioned later), as shown in FIG. 1.

The speed reducer 3 reduces a rotating speed of the motor 2, and increases drive torque.

The pinion 6 is disposed at an outer circumference of the output shaft 4 unitarily with the clutch 5.

The pinion driving solenoid 8 pushes out the pinion 6 in a direction to a side opposite to the motor 2 of the output shaft 4 (left in the FIG. 1) unitarily with the clutch 5 via a shift lever 7.

The main point of contact interrupts a current that flows into the motor 2.

Furthermore, the starter 1 has a rotation detector (mentioned later) that outputs a rotation signal of a frequency proportional to a rotating speed of the motor 2.

The motor 2 is mainly constituted of a magnetic field system, an armature 12, and brushes 14.

The magnetic field system is constituted by arranges a plurality of permanent magnets 11 to an inner circumference of a yoke 10 that forms a magnetic circuit.

The armature 12 is constituted by disposing a commutator 13 in one end of an armature shaft 12a.

The brushes 14 slidably contact an outer circumference of the commutator 13 following a rotation of the armature shaft 12a.

The motor 2 is a direct-current commutator motor that generates torque in the armature 12 in response to a supply of electric power from the battery 15 (refer to FIG. 2) when the main point of contact is turned on by the motor energizing switch 9.

It should be appreciated that the magnetic field system of the motor 2 may be an electromagnetic field system that uses a field winding instead of the permanent magnets 11.

The speed reducer 3 has planet gears 17 that engage with a sun gear 16 formed in another end of the armature shaft 12a.

The speed reducer 3 is a commonly known epicycle speed reducer in which the planet gears 17 engage with the sun gear 16 and rotates on their axes and revolve around the armature shaft 12a when the armature shaft 12a rotates.

A partition wall 18 that separates the motor 2 and the speed reducer 3 is disposed between the motor 2 and the speed reducer 3.

The partition wall 18 prevents wear debris etc. of the brushes 14 that wear out by slidably contacting the commutator 13 from infiltrating into an inside of the speed reducer 3 (gaps between gear engagements), or a slid-contacting part of the output shaft 4, for example.

The partition wall 18 is made of a plate material, such as iron which is a ferromagnetic substance, in a disk-like shape, for example. The partition wall 18 is arranged along a radial direction that intersects perpendicularly with the armature shaft 12a. An outer circumference of the partition wall 18 is fit to an inner circumference of the yoke 10 so that movement of the partition wall 18 in the radial direction is suppressed.

A circular hole is formed in a central part of the partition wall 18, and the end of the armature shaft 12a is passed through the circular hole.

In addition, an inner diameter of the circular hole is a little larger than an outer diameter (in this case, a tip diameter of the sun gear 16) of the armature shaft 12a so that the circular hole does not interfere with the armature shaft 12a.

Moreover, the sun gear 16 formed in the armature shaft 12a is formed ranging over both the speed reducer 3 side and the motor 2 side of the partition wall 18 in the longitudinal direction of the armature shaft 12a (an axial direction).

The output shaft 4 is arranged coaxially on the armature shaft 12a of the motor 2 via the speed reducer 3, and the drive torque of the motor 2 increased by the speed reducer 3 is transmitted to the output shaft 4 and rotates the output shaft 4.

The clutch 5 is disposed on the output shaft 4 by interlocking with a helical spline formed on the outer circumference of the output shaft 4.

The clutch 5 is constituted as a one-way clutch that transmits the drive torque of the motor 2 transmitted to the output shaft 4 to the pinion 6, while intercepts the torque transfer from the pinion 6 to the output shaft 4.

The pinion 6 is constituted unitarily with the clutch 5, and is disposed movable on the output shaft 4 unitarily with the clutch 5 when the clutch 5 rotates along with the helical spline.

Figure 2:
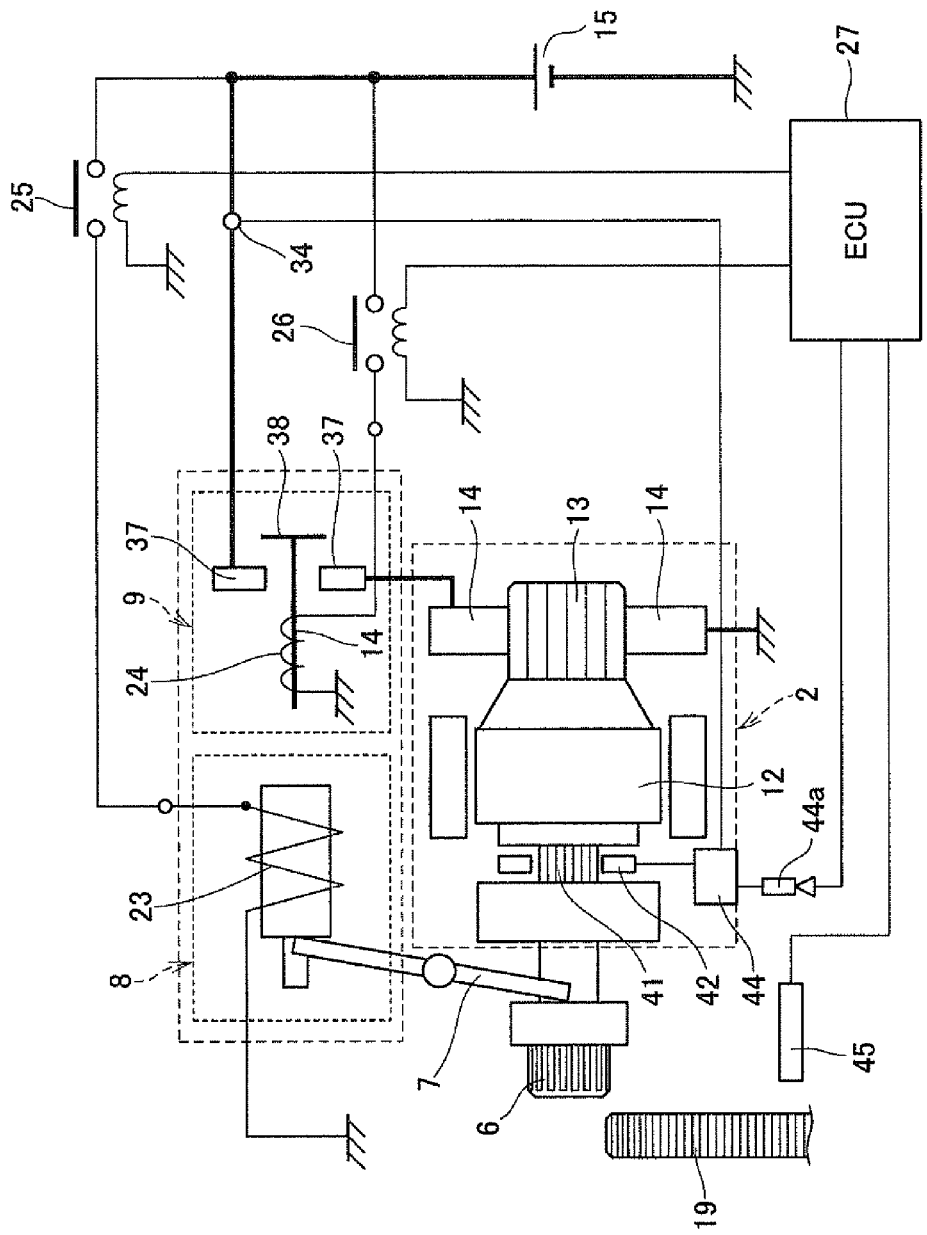
FIG. 2 shows an electric circuit diagram of the starter.

The pinion 6 moves in a direction opposite to the motor (left of FIG. 1) on the output shaft 4 and engages with a ring gear 19 of an engine (refer to FIG. 2).

The pinion 6 transmits the drive torque of the motor 2 transmitted via the clutch 5 to the ring gear 19 when engaged with the ring gear 19.

As shown in FIG. 1, both the pinion driving solenoid 8 and the motor energizing switch 9 are disposed in series in an axial direction, and are constituted unitarily as an electromagnetic switching device.

The electromagnetic switching device is mainly constituted of a bottomed-cylindrical frame 20, a solenoid unit (mentioned later) and a resin cover 21.

The frame 20 has an annular bottom at one end and another end is opened. The solenoid unit is inserted into the frame 20.

The resin cover 21 blockades an opening that opens to at the other end of the frame 20, and is fixed to the frame 20.

The frame 20 is formed to serve as a magnetic circuit common to the pinion driving solenoid 8 and the motor energizing switch 9, and is fixed to the starter housing 22 (refer to FIG. 1) with two stud bolts (not shown).

The solenoid unit has a first coil 23 used for the pinion driving solenoid 8, and a second coil 24 (a second solenoid) used for the motor energizing switch 9.

The first coil 23 is accommodated in the one end (attaching surface side) of the frame 20, and is connected to the battery 15 through a driving relay 25 shown in FIG. 2, and forms a first electromagnet by being energized from the battery 15.

The second coil 24 is accommodated in the other end of the frame 20, and is connected to the battery 15 through a driving relay 26 shown in FIG. 2, and forms a second electromagnet by being energized from the battery 15.

The driving relays 25 and 26 are closed by receiving an ON signal from an ECU 27 (refer to FIG. 2), which will be mentioned later, and are opened by receiving an OFF signal.

A common fixed iron core 28 is arranged between the first coil 23 and the second coil 24.

A first plunger 29 that faces one end surface (left end surface of FIG. 1) of the fixed iron core 28 and movable in an axial direction is disposed inside the first coil 23.

Moreover, the second plunger 30 that faces another end surface of the fixed iron core 28 and movable in an axial direction is disposed inside the second coil 24.

When the fixed iron core 28 is magnetized by energizing to the first coil 23, the first plunger 29 resists a reaction force of a return spring 31 disposed between the fixed iron core 28 and the first plunger 29, and is attracted in the one end surface of the fixed iron core 28.

Moreover, when the energization to the first coil 23 is stopped, the first coil 23 is pushed back in a direction opposite to the fixed iron core 28 (left of FIG. 1) by the reaction force of the return spring 31.

This first plunger 29 is formed in a substantially cylindrical shape with a cylindrical hole (not shown) in a central part in a radial direction.

The cylindrical hole is opened to one end (left-hand side of FIG. 1) of the first plunger 29, and has a bottom in another end.

A joint 32 that transmits a motion of the first plunger 29 to the shift lever 7 and a drive spring (not shown) that stores a reaction force for engaging the pinion 6 to the ring gear 19 of the engine are inserted in the cylindrical hole of the first plunger 29.

When the fixed iron core 28 is magnetized by energizing to the second coil 24, the second plunger 30 resists a reaction force of a return spring 33 disposed between the fixed iron core 28 and the second plunger 30, and is attracted in the other end surface of the fixed iron core 28.

Moreover, when the energization to the second coil 24 is stopped, the second coil 24 is pushed back in a direction opposite to the fixed iron core 28 (right of FIG. 1) by the reaction force of the return spring 33.

The resin cover 21 has a cylindrical leg portion. An end of the leg portion is inserted into an inner circumference of an opening of the other end of the frame 20, and the leg portion is fixed to the frame 20 by crimping the end of the frame 20 over a leveled portion formed on an outer circumference of the leg portion.

Two terminal bolts 34 and 35 connected to a power supply line for supplying electric power to the motor 2 from the battery 15 are fixed to the resin cover 21.

The two terminal bolts 34 and 35 are a B terminal bolt 34 connected to a high potential side (battery 15 side) of the power supply line, and an M terminal bolt 35 connected to a low potential side (motor 2 side) of the power supply line, respectively.

The terminal bolts 34 and 35 are passed through the resin cover 21 through penetration holes formed in the resin cover 21, and are fixed to the resin cover 21 by crimping washers 36.

A set of fixed contacts 37 and a moving contact 38 that form the above-mentioned main point of contact are disposed inside the resin cover 21.

The set of fixed contacts 37 are electrically connected with the two terminal bolts 34 and 35, and are combined mechanically.

That is, the set of fixed contacts 37 and the two terminal bolts 34 and 35 are prepared separately, and lower parts of the terminal bolts 34 and 35 are fixed to the resin cover 21 by press-fitting into circular holes formed in the fixed contact 37, for example.

Moreover, the terminal bolts 34 and 35 may be fixed to the resin cover 21 by forming serration to the lower parts of the terminal bolts 34 and 35 and press-fitting the lower parts to the circular holes of the fixed contact 37.

The two terminal bolts 34 and 35 and the set of fixed contacts 37 can also be formed with different kinds of metal.

For example, the fixed contact 37 may be formed with copper material that has high conductivity, and the two terminal bolts 34 and 35 may be formed with iron material that has high mechanical strength.

Moreover, copper plating or tinning may also be applied to surfaces of the terminal bolts 34 and 35 formed with the iron material.

In this case, in addition to the mechanical strength that the iron material has, the conductivity can be raised by plating on the surfaces of the terminal bolts 34 and 35.

In addition, the fixed contact 37 and the terminal bolts 34 and 35 may be formed unitarily, and heads of the terminal bolts 34 and 35 may be used as the fixed contact 37, for example.

The moving contact 38 is supported by an end of a shaft 39 made of resin fixed to the second plunger 30.

Moreover, the moving contact 38 is pressed to the end of the shaft 39 in response to the load of a contact pressure spring 40.

However, since the load of the contact pressure spring 40 is configured smaller than that of the return spring 33, the moving contact 38 is pushed to an inner side end of the resin cover 21 in the state where the pressure spring 40 is pushed and contracted when the second coil 24 is not energized (state shown in FIG. 1).

When the moving contact 38 pressed by the contact pressure spring 40 contacts to the set of fixed contacts 37 and between the fixed contacts 37 are electrically connected, the main point of contact becomes in a closed state (ON), and when the moving contact 38 separates from the set of fixed contacts 37 and the electrical connection between the fixed contacts 37 is interrupted, the main point of contact becomes in an opened state (OFF).

Next, the rotation detector is explained.

The rotation detector is disposed in the motor 2 side inner space separated by the partition wall 18, as shown in FIG. 1.

The rotation detector is constituted of a plurality of detection teeth 41, detecting coils 42, a case 43, and a signal-processing circuit 44.

Specifically, the detection teeth 41 are formed in the other end of the armature shaft 12a.

The detecting coils 42 are disposed annularly surrounding a circumference of the armature shaft 12a where the detection teeth 41 are formed.

The case 43 holds the detecting coils 42 and is fixed to the partition wall 18.

The signal-processing circuit 44 outputs a periodic change of an induced voltage generated in the detecting coils 42 as a rotation signal.

The detection teeth 41 are convex parts that face inner circumferences of the detecting coils 42 and are disposed in a circumferential direction of the armature shaft 12a at equal intervals.

In the first embodiment, the sun gear 16 formed in the other end of the armature shaft 12a can be used as the detection teeth 41.

However, it is possible also to form the plurality of detection teeth 41 independently from the sun gear 16.

The detecting coils 42 are magnetized by the signal-processing circuit 44 and form a bias magnetic field.

The magnetic flux that interlinks to the detecting coils 42 changes periodically because the plurality of detection teeth 41 rotates in the bias magnetic field.

The induced voltage is generated according to the changes of the magnetic flux.

The case 43 is formed by bending a plate-like material made of ferromagnetic substances, such as iron, and holds the detecting coils 42 between the partition wall 18 and the case 43, and forms the magnetic circuit together with the partition wall 18.

In the signal-processing circuit 44, a magnetization circuit, a waveform processing circuit, a power supply circuit and the like are disposed in a circuit board.

The magnetization circuit magnetizes the detecting coils 42 in order to form the bias magnetic field.

The waveform processing circuit processes the periodic change of the induced voltage that occurs in the detecting coils 42.

The power supply circuit supplies electric power to the waveform processing circuit.

In addition, the magnetization circuit and the power supply circuit may be the same.

In the signal-processing circuit 44, the circuit board is fixed to the case 43, for example, and the case 43 can be fixed to a motor side wall of the partition wall 18.

Methods of fixing the case 43 to the partition wall 18 can be, for example, a screw-fixing, or can also be fixed by resin insert molding.

Moreover, a power supply line of the signal-processing circuit 44 is connected to the B terminal bolt 34 or the M terminal bolt 35 that is fixed to the resin cover 21 of the electromagnetic switching device, for example (refer to FIG. 2), and the signal-processing circuit 44 can receive the electric power supply from the battery 15 through the B terminal bolt 34 or the M terminal bolt 35 connected to the power supply line of the motor 2.

The signal processed in the signal-processing circuit 44, i.e., the rotation signal obtained by waveform-processing the periodic change of the induced voltage that occurs in the detecting coils 42, is outputted to the external ECU 27 connected to the output terminal 44a shown in FIG. 2, and the rotating speed of the motor 2 is calculated by the ECU 27.

The ECU 27 is an electronic control unit that controls idling-stop, and an engine rotation signal, a position signal of a transmission shift lever, an ON/OFF signal of a brake switch, etc. are inputted from an engine ECU (not shown) that controls engine operational status.

An engine stop signal is transmitted to the engine ECU if the ECU 27 judges that a condition precedent for stopping the engine is satisfied based on the information inputted therein.

Moreover, if operations (for example, releasing the brake, shifting to a drive range, etc.) in which a driver is going to start a vehicle are performed after the idling-stop is performed, the ECU 27 judges that a re-starting demand is occurred and transmits a signal of a re-starting demand to the engine ECU, while the ON signal is outputted to the driving relays 25 and 26.

Next, operation of the starter 1 is explained.

The electromagnetic switching device equipped in the starter 1 of the present embodiment can control the operation of the pinion driving solenoid 8 and the operation of the motor energizing switch 9 independently by the ECU 27.

Hereafter, operation when the re-starting demand occurs during the engine stopping process (under inertia rotation until rotation of the engine stops completely) is explained as an example when the idling-stop is performed.

When the re-starting demand occurs during the engine stop process, the ECU 27 outputs the ON signal to the driving relay 25 first, then the ON signal is outputted to the driving relay 26 at the time when the rotating speed of the pinion 6 and the rotating speed of the ring gear 19 become smaller than predetermined relative number of rotations (for example, 100 rpm).

The ECU 27 calculates the rotating speed of the motor 2 based on the rotation signal inputted from the signal-processing circuit 44, and it calculates the rotating speed of the pinion 6 further by multiplying a moderating ratio of the speed reducer 3 to the rotating speed of the motor 2.

On the other hand, the rotating speed of the ring gear 19 is calculated based on the rotation signal outputted from a rotation detector 45 shown in FIG. 2.

In addition, the rotation detector 45 may be disposed in order to detect the rotation of the ring gear 19 directly, but it may also use an existing crank angle sensor.

When the driving relay 26 closes in response to the ON signal outputted from the ECU 27, the second coil 24 is energized from the battery 15 and the motor energizing switch 9 operates, thus the main point of contact closes.

As a result, the armature 12 of the motor 2 rotates in response to the supply of the electric power from the battery 15, and the drive torque of the armature 12 is amplified with the speed reducer 3 and transmitted to the pinion 6 to rotate the pinion 6.

Then, when the relative number of rotations of the pinion 6 and the ring gear 19 becomes below the predetermined value (for example, 100 rpm), the driving relay 25 is closed and energizes the first coil 23 from the battery 15.

Thereby, the pinion driving solenoid 8 starts operating and pushes the pinion 6 unitarily with the clutch 5 in a direction opposite to the motor 2 (ring gear 19 side) via the shift lever 7 so that the pinion 6 can engage with the ring gear 19 in the state where the pinion 6 is substantially synchronized with the rotation of the ring gear 19.

As a result, the driving torque of the motor 2 is transmitted to the ring gear 19 from the pinion 6, and can start the engine promptly.

(Effect of the First Embodiment)

In the first embodiment, since the rotating speed of the motor 2 is computable by ECU 27 based on the rotation signal outputted from the signal-processing circuit 44 built in the starter 1, the engine can be promptly re-started when the re-starting demand occurs after the idling-stop is performed.

That is, when the re-starting demand occurs while the rotation of the engine is slowing by inertia after the engine stopping command, the motor 2 is rotated before pushing out the pinion 6 to the ring gear 19 side, and the pinion 6 can be pushed out and can engage to the ring gear 19 when the relative number of rotations of the pinion 6 and the ring gear 19 becomes below the predetermined value.

In this case, more precise control of the starter 1 becomes possible as compared with a method disclosed in Japanese Patent Application Laid-Open Publication No. 2011-29138, which is the method that memorizes the rotation starting characteristic of the motor 2 in an internal memory of a control device, and presuming the rotating speed of the pinion 6 based on the lapsed time after turning on the motor 2.

As a result, since it becomes possible to engage the pinion 6 and the ring gear 19 smoothly, reduction of the noise occurred at the time of engagement and wear control of gears can be continued for a long period of time.

Moreover, the starter 1 shown in the first embodiment has the rotation detector disposed in the motor 2 side inner space separated by the partition wall 18.

Thereby, since it is not necessary to secure an installation space of the rotation detector outside the starter 1, an installing nature to the engine is not spoiled by having the rotation detector installed therein.

Furthermore, since the partition wall 18 that separates between the motor 2 and the speed reducer 3 is formed of the plate material such as iron which is the ferromagnetic substances, the partition wall 18 can form the magnetic circuit together with the case 43 that holds the detecting coils 42.

That is, since the partition wall 18 can be used as a part of the magnetic circuit, the number of parts exclusively used to form the magnetic circuit can be reduced.

As a result, a total number of parts can be reduced and the structure of the rotation detector can be simplified.

Moreover, by connecting the power supply line to the B terminal bolt 34 or the M terminal bolt 35 that is fixed to the resin cover 21 of the electromagnetic switching device, the signal-processing circuit 44 of the rotation detector can receive the electric power supply from the battery 15 through the B terminal bolt 34 or the M terminal bolt 35.

According to the composition mentioned above, since it is not necessary to provide an electric power supply line for exclusive use from outside the starter 1 to the signal-processing circuit 44, connections of the wiring relative to the vehicle side does not increase.

Therefore, the ease of installing the starter 1 is not deteriorated by having the rotation detector.

Furthermore, since the circuit board is attached to the motor side wall of the partition wall 18, the detecting coils 42 and the circuit board can be arranged closely, and since the circuit board is not exposed outside the starter 1, the signal-processing circuit 44 can protect the circuit board from getting wet etc.

Second Embodiment

It should be appreciated that, in the following embodiments, the components identical with or similar to those in the first embodiment are given the same reference numerals for the sake of omitting explanation.

Figure 3:
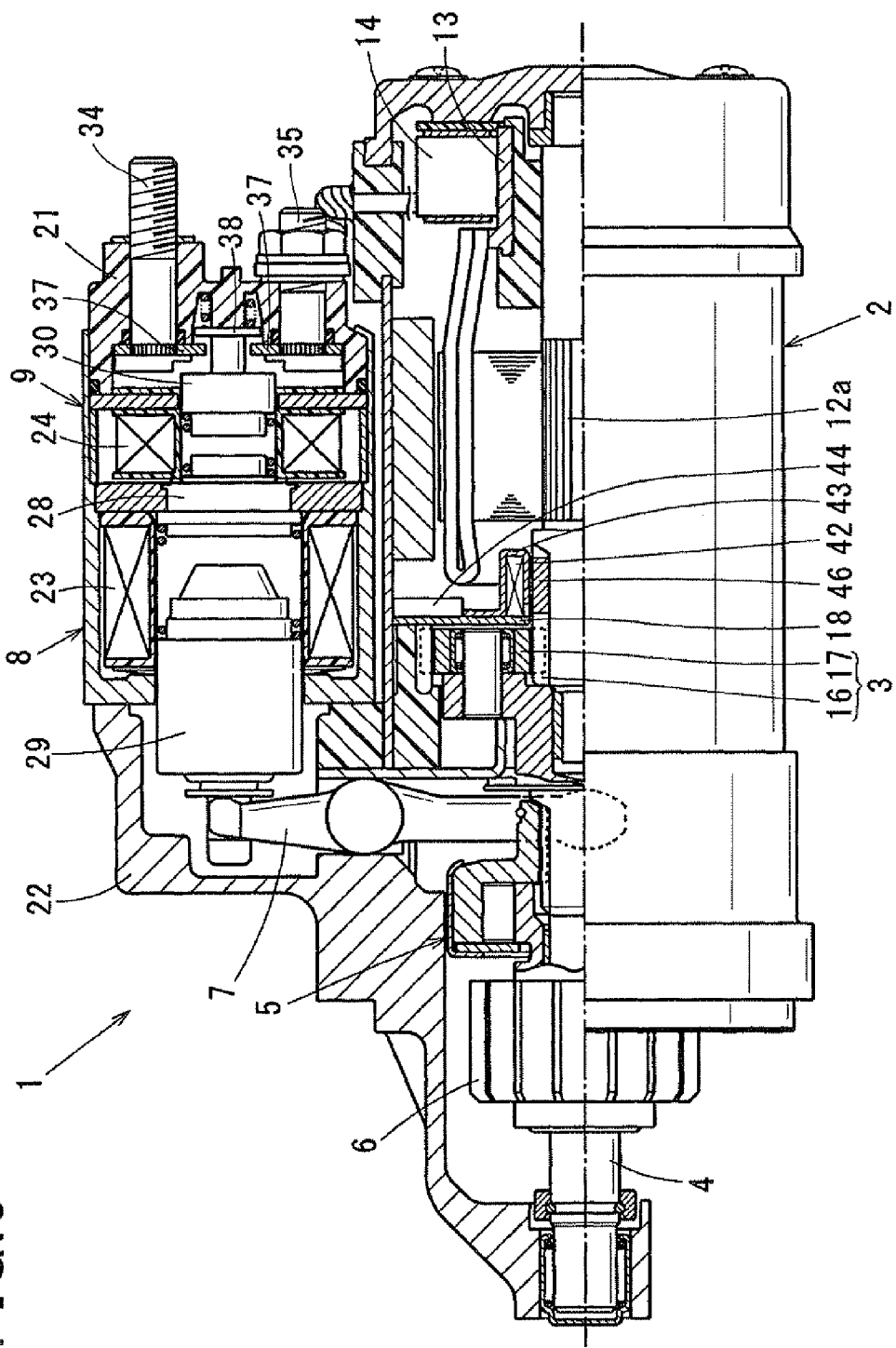
FIG. 3 shows a sectional view of the starter in a second embodiment.

The composition of the rotation detector in the second embodiment differs from that of the first embodiment, and as shown in FIG. 3, a yoke that forms a claw-pole type magnetic circuit is disposed in the circumference of the detecting coils 42, and permanent magnets 46 are disposed onto the armature shaft 12*a*.

The yoke that forms the claw-pole type magnetic circuit is formed by the partition wall 18 and the case 43.

Figure 4:
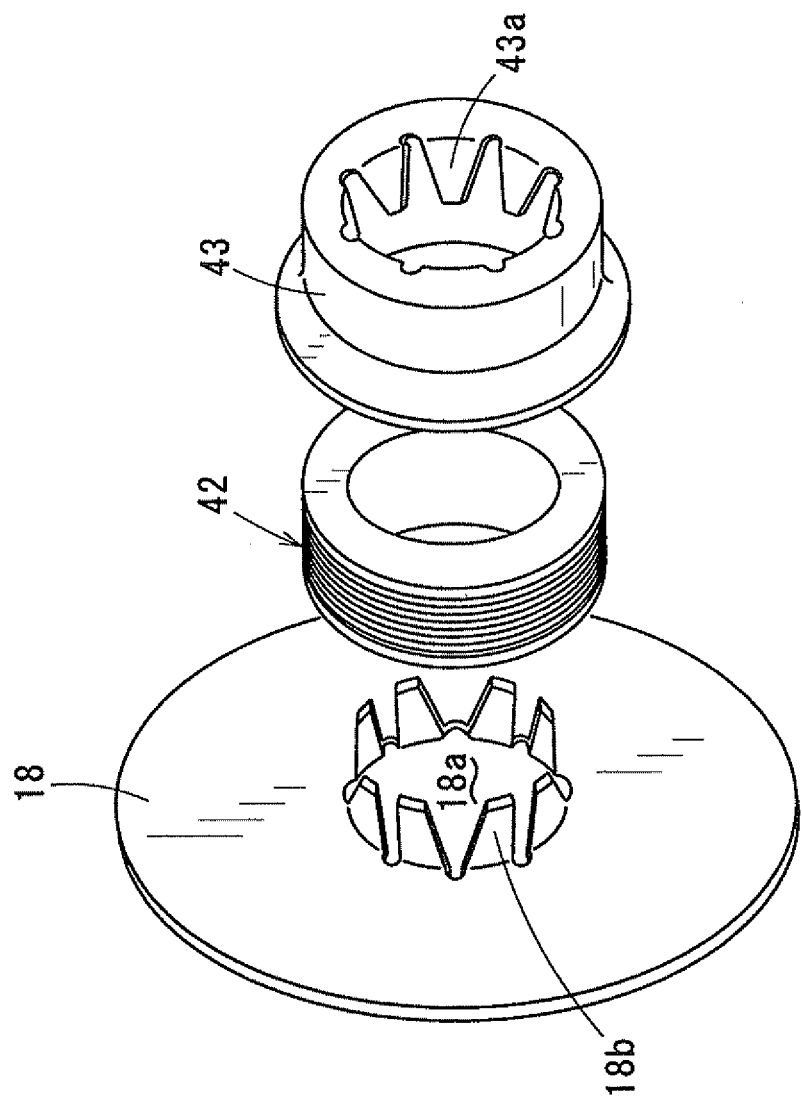
FIG. 4 is an exploded perspective view showing a composition of a rotation detector used in the second embodiment.

As shown in FIG. 4, a plurality of nail-like magnetic poles 18*b* prolonged in an axial direction from a periphery of a circular hole 18*a* are formed in a circumferential direction at equal intervals on the partition wall 18.

On the other hand, a plurality of nail-like magnetic poles 43*a* prolonged in the axial direction from an inner circumference edge are formed in the circumferential direction at equal intervals on the case 43 that holds the detecting coils 42 between the partition wall 18.

The yoke is formed by arranging the nail-like magnetic poles 18*b* formed in the partition wall 18 and the magnetic poles 43*a* formed in the case 43 in the circumferential direction alternately so that magnetic poles 18*b* and magnetic poles 43*a* engage.

The permanent magnet 46 is disposed at a concave portion formed between the teeth of the sun gear 16 formed in the armature shaft 12*a* and is fixed by, for example, adhesion.

In the rotation detector shown in the second embodiment, since a polarity of the magnetic pole 18*b* of the partition wall 18 and the magnetic pole 43*a* of the case 43 changes alternately from a rotation of the permanent magnet 46 attached to the armature shaft 12*a*, alternating flux is generated to the yoke that forms the magnetic circuit.

As a result, since the induced voltage according to the frequency of alternating flux occurs in the detecting coils 42, the rotation signal can be acquired like the first embodiment by waveform-processing the periodic change of the induced voltage by the waveform processing circuit.

In addition, bonded magnets molded according to shapes of concave portions formed between the teeth of the sun gear 16 can also be used as the permanent magnet 46.

Moreover, although the permanent magnet 46 may be disposed between all the teeth of the sun gear 16, the number of the permanent magnets 46 to be used may be reduced.

Third Embodiment

The third embodiment is another example of the rotation detector that has arranged the yoke that forms the claw-pole type magnetic circuit in the circumference of the detecting coils 42 like the second embodiment, and uses the permanent magnet 46.

Figure 5:
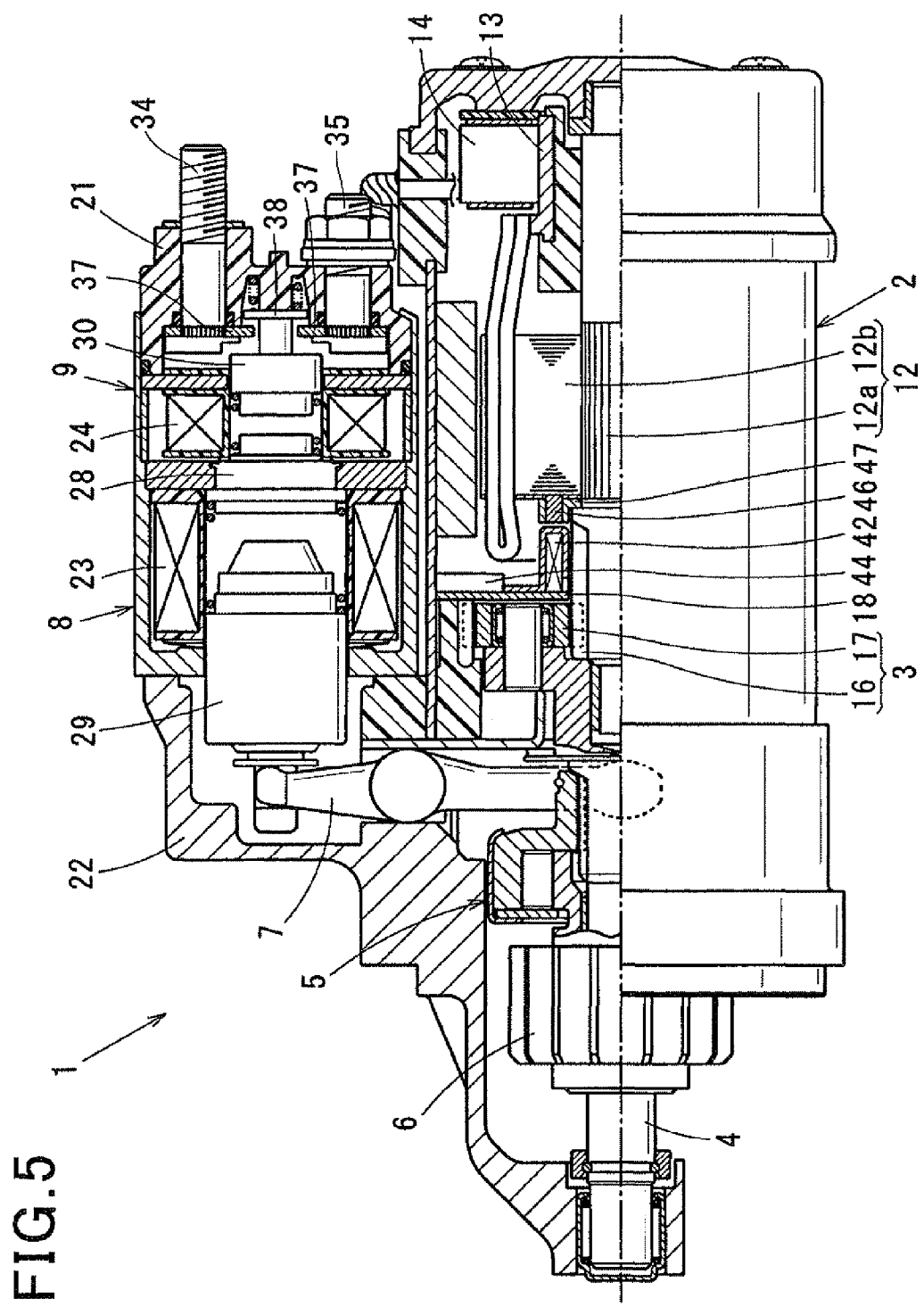
FIG. 5 shows a sectional view of the starter in a third embodiment.

A different point from the second embodiment is arrangement of the permanent magnet 46. That is, in the third embodiment, as shown in FIG. 5, a plurality of permanent magnets 46 are held by a ring-like holder 47 attached to an end opposite to the commutator 13 of the armature core 12*b* supported by the armature shaft 12*a*.

The composition of the yoke that forms the detecting coils 42 and the magnetic circuit is the same as those of the second embodiment.

Also in the composition of the third embodiment, since the alternating flux occurs to the yoke from the rotation of the permanent magnet 46 and the voltage according to the alternating flux is induced by the detecting coils 42 like the second embodiment, the rotation signal can be acquired by waveform-processing the periodic change of the induced voltage.

(Modification)

Although the first embodiment explains the operation when the re-starting demand occurs during the process where the idling-stop is performed and the engine is stopping, since the starter 1 of the present disclosure can control the operation of the pinion driving solenoid 8 and the operation of the motor energizing switch 9 independently, the starter 1 can respond suitably also when re-starting from the completely stopped engine by the idling-stop.

Although the rotation detector disclosed in the first to third embodiments has the composition that the induced voltage is generated in the detecting coils 42 by change of magnetic flux and outputs the periodic change of the induced voltage as the rotation signal, it is also possible to replace the detecting coils 42 by a Hall element, MR element (magneto-resistive element), a photoelectric element, etc., for example.

What is claimed is:

1. A starter comprising:
a motor that has an armature with a commutator disposed in an end of an armature shaft and generates torque in the armature;
a speed reducer that reduces a rotating speed of the motor and increases drive torque, the speed reducer being disposed in the motor opposite to the commutator;
a pinion that transmits the drive torque increased by the speed reducer to an engine ring gear;
a partition wall that is disposed between the motor and the speed reducer to separate the motor and the speed reducer, the partition wall having a hole formed in a central part for passing through the end of the armature shaft;
a pinion driving solenoid that forms a first electromagnet by energization, and pushes out the pinion to the ring gear side by using an attraction power of the first electromagnet; and
a motor energizing switch that has a second solenoid that forms a second electromagnet by energization, and opens and closes an electric point of contact interlocking with an ON/OFF operation of the second solenoid for intermitting a current flowing into the motor, wherein the starter is able to control independently operation of the pinion driving solenoid and operation of the motor energizing switch separately, the starter further comprising a rotation detector that outputs a rotation signal of a frequency proportional to the rotating speed of the motor, and the rotation detector is disposed in a motor side inner space where the armature is disposed separated by the partition wall.

2. The starter according to claim 1, wherein the rotation detector has a detecting coil, which is disposed annularly surrounding a circumference of the armature shaft, that generates an induced voltage according to changes of a magnetic flux interlinked with a rotation of the armature shaft, and a periodic change of the induced voltage generated in the detecting coil is outputted as the rotation signal.

3. The starter according to claim 2, wherein the rotation detector has a plurality of detection teeth that face an inner circumference of the detecting coil and are disposed in a circumferential direction of the armature shaft at equal intervals, and the detecting coil is magnetized to form a bias magnetic field and the magnetic flux that interlinks to the detecting coil changes periodically due to the rotation of the plurality of detection teeth in the bias magnetic field.

4. The starter according to claim 3, wherein the speed reducer is an epicycle reduction gear that has planet gears that engage with a sun gear formed in another end of the armature shaft, the planet gears engage with the sun gear and rotate on their axes and revolve around the armature shaft, and the plurality of detection teeth formed in the armature shaft are formed by the sun gear.

5. The starter according to claim 2, wherein the rotation detector has a permanent magnet, which is attached to the armature shaft or one end side opposite to the commutator of the armature core supported by the armature shaft, that rotates unitarily with the armature, and a yoke that forms a claw-pole type magnetic circuit disposed in a circumference of the detecting coil that is magnetized with the permanent magnet.

6. The starter according to claim 1, wherein the partition wall is made of a plate material, which is a ferromagnetic substance.

7. The starter according to claim 1, wherein the motor energizing switch forms the electric point of contact between a battery side terminal and a motor side terminal that are connected to a power supply line for supplying electric power to the motor from a battery, and the electric power is supplied to the rotation detector through the battery side terminal or the motor side terminal.

8. The starter according to claim 1, wherein the rotation detector has a circuit board that includes a waveform processing circuit that processes a periodic change of an induced voltage that occurs in the detecting coils, and the circuit board is attached to a motor side wall of the partition wall.

* * * * *